May 24, 1966  R. J. HOLTON  3,252,728
FASTENER DEVICE AND HANDLE ASSEMBLY
Filed May 6, 1964  3 Sheets-Sheet 1

INVENTOR.
ROBERT J. HOLTON
BY
*Jeare, Fetzer & Jeare*
ATTORNEYS

May 24, 1966  R. J. HOLTON  3,252,728
FASTENER DEVICE AND HANDLE ASSEMBLY
Filed May 6, 1964  3 Sheets-Sheet 2

INVENTOR.
ROBERT J. HOLTON
BY
*Teare, Tietzer & Teare*
ATTORNEYS

May 24, 1966   R. J. HOLTON   3,252,728
FASTENER DEVICE AND HANDLE ASSEMBLY
Filed May 6, 1964   3 Sheets-Sheet 3

INVENTOR.
ROBERT J. HOLTON
BY
*Jeare, Fetzer & Jeare*
ATTORNEYS

United States Patent Office 3,252,728
Patented May 24, 1966

3,252,728
FASTENER DEVICE AND HANDLE ASSEMBLY
Robert J. Holton, Cleveland, Ohio, assignor to Tinnerman Products, Inc., Cleveland, Ohio, a corporation of Ohio
Filed May 6, 1964, Ser. No. 365,346
7 Claims. (Cl. 294—31.2)

This invention relates to a fastener and more particularly to an improved fastener device and handle assembly suitable for use in culinary applications, such as with glassware and the like.

Heretofore, various band and handle arrangements have been employed for culinary purposes, such as in the clamping of a handle to a utensil or vessel made of vitreous materials, such as glass or the like. In such heretofore known arrangements, the handle is generally provided with a socket or pocket to receive the free end portions of a clamping band which is adapted to be closed about the utensil. In use of such conventional arrangements, the attachment between the handle and the band, which actually provides the major support for the assembly, is accomplished merely by the resilient spring-like characteristics of the material comprising the aforementioned free end portions of the band which are received in the socket or pocket of the handle. It has been found that while such heretofore known arrangements provide a relatively simple construction, they do not provide for facile assembly of the parts; nor do such arrangements permanently hold the parts together, particularly when there exists any tolerance variation between the assembled parts. Moreover, such heretofore known arrangements provide a generally loose fit between the parts, especially after extended usage thereof, which results in damage or actual breakage of the utensil due to displacement or dropping of the utensil from the handle assembly.

Accordingly, an object of the present invention is to provide an improved fastening device for cooperative use with a handle and band assembly adapted to detachably mount a vessel or the like.

Another object of the present invention is to provide an improved fastening device to the character described which is of a simple, yet rugged construction and which can be easily and inexpensively produced.

A further object of the present invention is to provide an improved fastening device of the character described which can permanently attach a handle and band together simply by inserting free end portions of the band into a socket provided in the handle, and then by disposing the fastening device in resilient coacting locking engagement with the free end portions of the band within the socket.

A still further object of the present invention is to provide an improved fastening device and handle assembly including a handle and flexible band which can readily and easily be detachably clamped around a vessel or the like.

Other objects and advantages of the invention will be apparent from the following description taken in conjunction with the accompanying drawings wherein.

In general, the present invention provides an improved fastening device construction for cooperative use with a handle and band assembly for mounting vessels, such as glassware utensils or the like. The handle is provided with a socket into which free end portions of the band are held to maintain the band in resiliently clamped relation about the vessel. The fastening device is constructed and arranged for facile insertion into the handle socket for resilient coacting engagement with the free end portions of the band and confronting portions of the socket thereby to permanently hold the parts together as a unit in their assembled relation.

Figure 1:
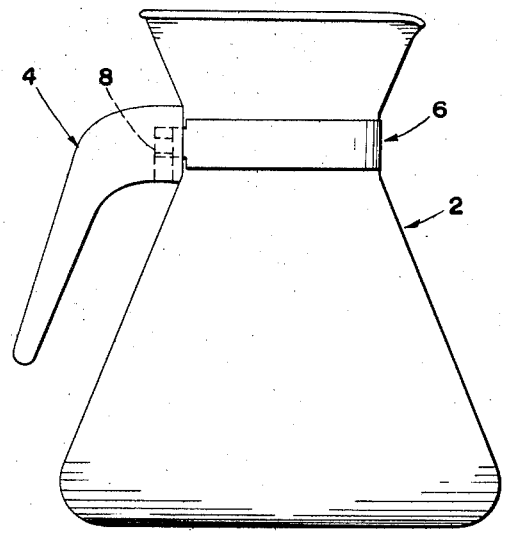
FIG. 1 is a side elevational view diagrammatically showing the attachment of the handle and band assembly of the present invention to a vessel, such as a glassware utensil.

Referring now again to the drawings and in particular to FIG. 1 thereof there is shown a vessel, designated generally at 2, such as a glassware utensil. The vessel 2 is provided with a carrying handle 4 for ready attachment thereto by means of a flexible clamping band 6 which can be resiliently closed in gripping relation about the vessel. In accordance with the present invention a fastening device, designated generally at 8, is inserted into the handle 4 for coacting engagement with the clamping band 6 to permanently lock the handle, band and vessel as a unit in rigid relationship with one another.

Figure 2:
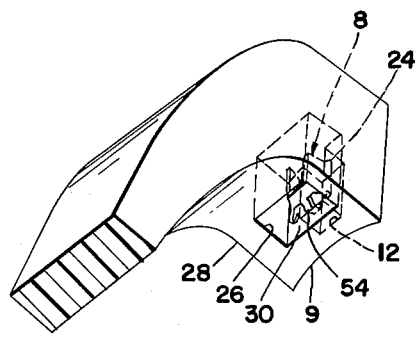
FIG. 2 is a generally fragmentary perspective view on an enlarged scale showing the handle removed from the assembly, and illustrating the improved fastening device of the present invention disposed within a socket provided in the handle.
Figure 4:
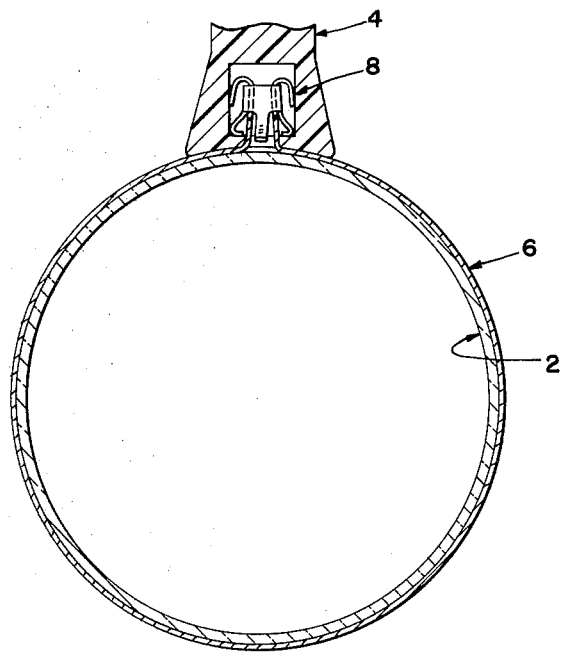
FIG. 4 is an enlarged fragmentary section view and showing the fastening device of the present invention in the installed position for mounting the handle and band assembly on the vessel.
Figure 5:
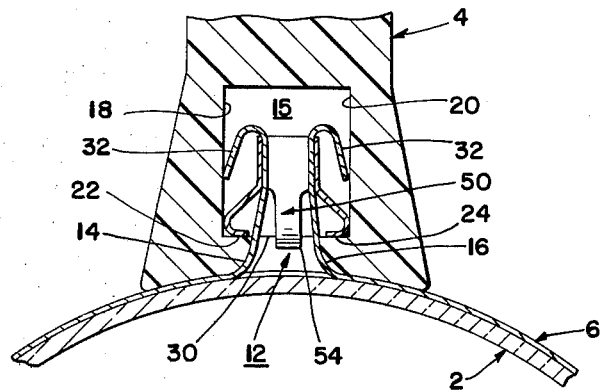
FIG. 5 is a fragmentary cross sectional view on an enlarged scale illustrating the fastening device of the present invention for locking free end portions of the band within the handle socket.

As best illustrated in FIGS. 2, 4 and 5, the carrying handle 4 may be of any suitably shaped configuration and is preferably provided with an arcuate end surface portion 9 for uniform abutment against the corresponding curved wall surface of the vessel 2. In the embodiment shown, the end surface portion 9 is provided with a generally polygonal shaped entrance slot 12 having generally flared or rounded side walls 14 and 16 (FIG. 5). The slot 12 opens into a generally polygonal socket 15, such as the rectangular shape illustrated, having side walls 18 and 20 spaced laterally from the entrance slot 12 and defining a pair of oppositely disposed generally longitudinally extending shoulders 22 and 24. As shown, another entrance slot 26 of generally polygonal shaped configuration is provided in the side wall surface portion 28 of the handle which slot is disposed at substantially a right angle relative to the first mentioned entrance slot 12. The latter entrance slot 26 also opens into the socket 15 and defines another interior shoulder 30 which extends generally transversely relative to the first mentioned shoulders 22 and 24. The socket 15 in the form shown is preferably of a height and depth sufficient to accommodate portions of the flexible clamping band 6 and the fastening device 8 when inserted therein, as will hereinafter be more fully described.

Figure 3:
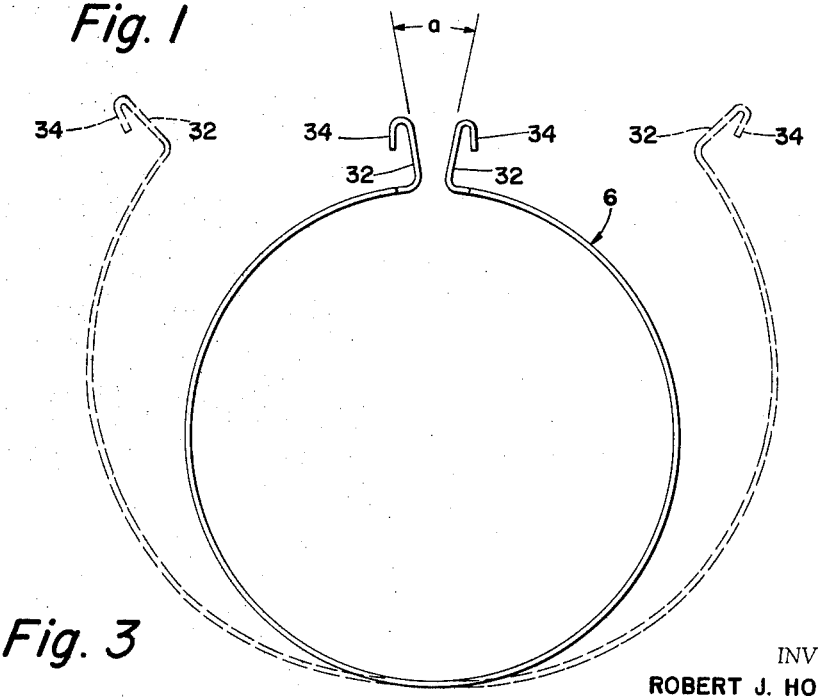
FIG. 3 is a top plan view of the flexible clamping band removed from the assembly illustrating in broken lines the free position of the band prior to being closed around a vessel; and in solid lines illustrating the fixed position of the band after being closed around a vessel.

As best shown in FIG. 3, the flexible clamping band 6 is generally of a circular configuration comprised of metal material preferably of a spring-like nature, such as cold rolled metal having spring-like characteristics. The band 6 is provided with oppositely disposed free end portions 32 each of which is preferably bent angularly outwardly at an angle of approximately 11° relative to the circular portion of the band. In the embodiment shown, the free end portions 32 are further provided with reverse bend portions 34 folded generally back to extend generally angularly outwardly away from the portions 32. Due to the spring characteristics of the material, the band 6 is normally in somewhat of an untensioned free position as shown in broken lines. In the applied position around a vessel, the band 6 is partially closed or in a fixed tensioned position as shown in solid line so that the included angle (a) between the free end portions 32 is approximately 22° so as to be readily accomodated within the socket 15 in the handle 4.

Figure 6:
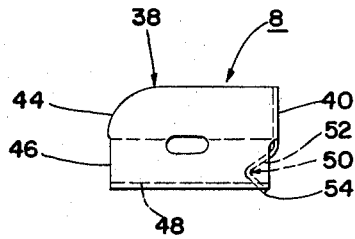
FIG. 6 is a side elevational view of the improved fastening device of the present invention removed from the assembly.
Figure 7:
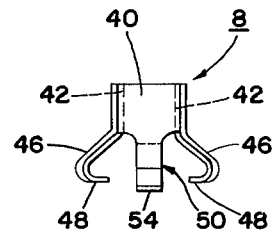
FIG. 7 is an end view of the improved fastening device of the present invention and looking from the right hand side of FIG. 5.
Figure 8:
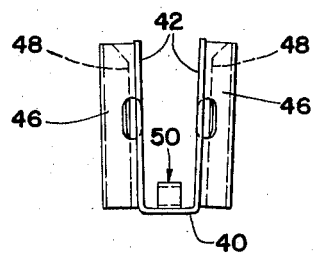
FIG. 8 is a top plan view of the fastening device of FIG. 6.

In accordance with the present invention and as best shown in FIGS. 6 to 8, inclusive, the fastening device 8 may be formed from a single piece or blank of sheet metal stock and bent into the configuration shown. The fastening device 8 comprises a generally U-shaped, in plan (FIG. 7), body 38 defined by an end wall 40 and a pair of oppositely disposed side walls 42. The side walls 42 extend angularly outwardly from the end wall 40 by an angle of approximately 2° to facilitate insertion into the socket 15 for resilient coacting engagement with the free end portions 32 of the band 6. The side walls 42 are preferably rounded, as at 44, to facilitate insertion of the fastening device into the socket 15 in the handle.

As best shown in FIG. 7, each of the respective side walls 42 includes a downwardly and angularly outwardly extending resilient leg 46 which legs are spaced apart by an amount sufficient to be slidably, yet tightly inserted between the side walls 18 and 20 of the socket 15 in the handle 4. In the embodiment shown, the resilient legs 46 each include an inturned distal edge portion 48 extending generally longitudinally thereof and having a width sufficient to be slidably received on and engageably supported by the generally longitudinally extending interior shoulders 22 and 24 of the socket 15 (FIG. 5).

As shown in FIGS. 6 and 7, the end wall 40 of the fastening device 8 may be provided with a resilient, finger-like member 50 disposed intermediate the resilient legs 46 and including an angularly inwardly bent portion 52 and an angularly outwardly bent portion 54 which together define a generally U-shaped, in side elevation, configuration. In the embodiment shown, the latter bent portion 54 extends angularly downwardly slightly beyond the plane of the underside of the fastening device 8 and by an amount sufficient to be engageably retained by the generally transversely extending interior shoulder 30 of the socket 15, as best shown in FIG. 2.

In a typical assembly of the handle 4 and clamping band 6 with a vessel, such as designated at 2, the band is mounted around the vessel and the free end portions 32 are simply brought together upon application of pressure being applied thereto. The free end portions 32 of the band are then inserted into the handle socket 15 via entrance slot 12 whereupon, under the residual spring characteristics of the material, the reverse bend portions 34 spring outwardly into abutting engagement against the side walls 18 and 20 of the socket 15. The fastening device 8 is then inserted through the other entrance slot 26 with its open end first so that the angularly flared side walls 42 thereof are engageably wedged between the free end portions 32 and the reversed bend portions 34 of the band 6 which causes the latter to be tightly and resiliently clamped around the vessel 2. Continued movement of the fastening device 8 into the socket 15 causes the resilient finger-like member 50 to be snapped downwardly behind and into coacting engagement with the transversely extending interior shoulder 30 of the socket 15 and with the angularly outwardly bent portion 54 of the finger effectively preventing the fastener device from "backing-up" or sliding out of the socket 15. In the final installed position of the fastening device, the resilient legs 46 and inturned distal edge portions 48 thereof are resiliently biased against the confronting side walls 18 and 20 and the generally longitudinally extending shoulders 22 and 24, respectively, of the socket 15 to permanently lock the handle 4 to the clamping band 6, and hence to rigidly and resiliently clamp the handle 4 and band 6 as a unit to the vessel 2.

Figure 9:
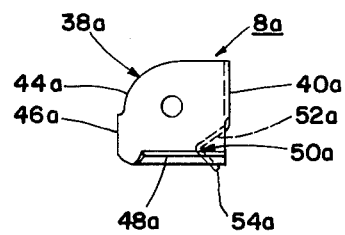
FIG. 9 is a side elevational view of a modified form of the improved fastening device of the present invention.
Figure 10:
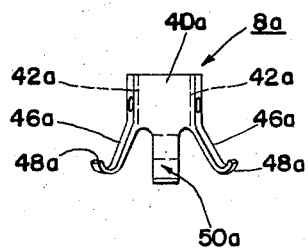
FIG. 10 is an end view of the improved fastening device of the present invention and looking from the right hand side of FIG. 9.
Figure 11:
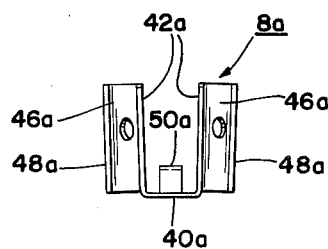
FIG. 11 is a top plan view of the improved fastening device of FIG. 10.

The fastening device designated generally at 8a of FIGS. 9 to 11, is generally of a similar type as that illustrated in FIGS. 6 to 8, inclusive, except that in the form shown the fastening device 8a approximates a generally square-shaped, in elevation, configuration. The body 38a is similarly of a generally U-shaped, in plan FIG. 11, configuration defined by an end wall 40a and a pair of oppositely disposed side walls 42a which extend angularly outwardly relative to one another and from the end wall 40a by an angle of approximately 2° and for the reasons, as aforementioned. Again, the side walls 42a are preferably rounded, as at 44a, to facilitate insertion of the fastening device into the handle socket 15. The side walls 42a similarly include downwardly and angularly outwardly extending resilient legs 46a, but in this form each leg preferably includes an upturned distal edge portion 48a extending generally longitudinally thereof for coacting engagement with the interior shoulders 22 and 24 and the side walls 18 and 20 of the socket 15.

As best shown in FIG. 9, the end wall 40a is provided with the aforementioned type of resilient, finger-like member 50a disposed intermediate the resilient legs 46a and including an angularly inwardly bent portion 52a and an angularly outwardly bent portion 54a. The latter portion 54a again constructed to extend downwardly slightly beyond the plane of the underside of the fastening device so as to be engageably retained by the transversely extending interior shoulder 30 provided in the socket 15 to prevent "backing-up" of the fastening device from within the socket.

From the foregoing description and accompanying drawings, it can be seen that the present invention provides several important advantages over heretofore known types of band and handle arrangements for attachment to a vessel, such as a glassware utensil or the like. More specifically, the present invention provides an improved fastening device of simple and inexpensive construction which can be facilely inserted into a socket provided in a carrying handle, and which upon insertion automatically and effectively locks the handle to an associated band for clamping the handle to a vessel. By such an arrangement the parts are more permanently and rigidly held together compared to heretofore known types of arrangements, particularly when there exists any tolerance variation between the assembled parts.

The terms and expressions which have been used are terms of description and not of limitation and there is no intention in the use of such terms and expressions of excluding any equivalents of the features shown or described, or portions thereof, but it is recognized that various modifications are possible within the scope of the invention claimed.

I claim:

1. A fastening device for insertion into a socket in a handle for retaining a flexible band in clamped position around a vessel or the like, said device being formed from a piece of metal sheet material having a spring-like character, and comprising an end wall and a pair of oppositely disposed side walls which extend divergently from one another in a general direction away from said end wall thus forming a U-shaped structure for receiving therebetween the free ends of said band, a resilient leg made integral with and extending from each side wall, said legs extending divergently outwardly from one another in a general direction away from said side walls, each leg forming an extension of and being substantially co-extensive in length with one of said side walls for engagement with the confronting interior surface of said socket, and a flexible finger made integral with said end wall and depending therefrom intermediate said legs, said finger projecting beyond the extension of said legs a sufficient distance for snap-fastening engagement with a confronting interior surface portion of said socket to prevent withdrawal of said device from said socket.

2. A fastening device in accordance with claim 1, wherein each of said legs includes an inturned marginal edge portion extending substantially the full length thereof for engagement with confronting interior surface portions of said socket, and said finger having an angularly, inwardly extending portion made integral with said end wall and an angularly outwardly extending outer end portion.

3. A fastening device in accordance with claim 1, wherein the corners of said side walls at the end remote from said end wall are rounded to facilitate insertion into said socket.

4. A handle and band assembly comprising, a flexible band having free end portions bent upon themselves disposed around an article, such as a vessel or the like, a handle having a socket therein defined by side walls for receiving the free ends of said band therein, and a fastening device inserted into said socket and engageably coacting with the free ends of said band for retaining the latter in clamped relation around said article, said device comprising an end wall and a pair of integral resilient side walls which extend from the said end wall for receiving the free ends of said band therebetween, each side wall has a depending resilient leg, said resilient legs extend divergently outwardly from one another in a general direction away from said side walls for engagement with the side walls of said socket, and a resilient finger depending downwardly from said end wall and intermediate said legs, said finger projecting beyond the extension of said legs by an amount sufficient for snap-fastening engagement with an interior surface portion of said socket to prevent withdrawal of said device from said socket.

5. A handle and band assembly in accordance with claim 4, wherein each of said legs includes an inturned marginal edge portion extending substantially the full length thereof for engagement with confronting interior surface portions of said socket, and said finger having an angularly inwardly extending portion made integral with said end wall and an angularly outwardly extending outer end portion.

6. A handle and band assembly comprising, a flexible band having free end portions bent at an angle upon themselves, said band disposed around an article, such as a vessel or the like, a handle having a socket therein with a first entrance slot for receiving the free ends of the band inserted into said socket and a second entrance slot for insertion of a fastening device into said socket, said device comprising an end wall and a pair of oppsetely disposed resilient side walls which extend divergently away from one another in a general direction away from said end wall and receiving the free ends of said band therebetween, a resilient leg made integral with and extending from each side wall, said legs extending divergently from one another in a general direction away from side walls and disposed in engaged relationship with the side walls of said socket, said legs forming extensions of and being substantially co-extensive in length with said side walls, and a resilient finger depending from said end wall and intermediate said legs having a free end portion which projects beyond the extension of said legs a sufficient distance for snap-fastening engagement with an interior surface portion of said socket to prevent withdrawal of said device from said socket in the assembled position thereof.

7. A handle and band assembly comprising, a flexible band having free end portions bent at an angle upon themselves and disposed around a vessel or the like in the form of an upright cylinder, a handle having a polygonal socket therein defined by oppositely disposed side walls, said handle having a first entrance slot opening into said socket and defining with said socket a pair of spaced, parallel generally vertically extending shoulders, first entrance slot disposed for receiving the free ends of said band inserted into said socket, said handle having a second entrance slot disposed at an angle relative to said first entrance slot and defining with said socket a shoulder disposed transversely of said first mentioned shoulder, said second entrance slot disposed for receiving a fastening clip inserted into said socket, said clip comprising an end wall and a pair of resilient side walls extending divergently from one another in a direction away from said end wall for receiving the free ends of said band therebetween, a resilient leg made integral with and extending from each side wall, said legs extending divergently from one another in a geenral direction away from said side walls, the free end of each of said legs including a bent edge portion disposed for engagement with the generally vertically extending shoulders within said socket, and a resilient finger depending from said end wall and intermediate said legs having a free end portion which projects beyond the extension of said legs and disposed for snap-fastening engagement with the marginal portion of said transversely extending shoulder to prevent withdrawal of said clip from said socket in the assembled position thereof.

References Cited by the Examiner

UNITED STATES PATENTS

| | | | |
|---|---|---|---|
| 215,037 | 5/1879 | Atkinson | 24—259 |
| 1,879,024 | 9/1932 | Barto | 24—259 X |
| 2,125,747 | 8/1938 | Zadek | 24—259 |
| 2,554,761 | 5/1951 | Walder | 294—31.2 |
| 2,618,328 | 11/1952 | Latham | 24—259 X |
| 3,058,768 | 10/1962 | Freiman | 294—31.2 |

GERALD M. FORLENZA, *Primary Examiner.*

G. F. ABRAHAM, *Examiner.*